United States Patent [19]

Paulson et al.

[11] Patent Number: 4,882,874
[45] Date of Patent: Nov. 28, 1989

[54] PESTICIDE APPLICATOR

[76] Inventors: Peter O. Paulson, 320 Pumphill Gardens S.W., Calgary, Alberta, T2V 4M7; James E. Paulson, 2021 Seventh Street S.W., Calgary, Alberta, T2T 2X1, both of Canada

[21] Appl. No.: 225,499

[22] Filed: Jul. 28, 1988

[30] Foreign Application Priority Data

Aug. 21, 1987 [GB] United Kingdom ............... 8719814

[51] Int. Cl.⁴ ............................................. A01N 5/00
[52] U.S. Cl. ........................................ 47/1.5; 401/68; 401/55
[58] Field of Search ..................... 47/1.5, 1.7; 401/19, 401/49, 55, 68, 116, 117

[56] References Cited

U.S. PATENT DOCUMENTS 2,482,874  9/1949  Roland ................................ 401/55
3,443,874  5/1969  Pelli .................................... 401/55
4,363,560 12/1982  Gentile ................................ 401/68
4,716,677  1/1988  Moore ................................ 47/1.5

Primary Examiner—Robert A. Hafer
Assistant Examiner—Lynda M. Cofsky
Attorney, Agent, or Firm—Arne I. Fors; Robert F. Delbridge

[57] ABSTRACT

An applicator for applying a pesticide such as a herbicide with a solid carrier is disclosed. The applicator comprises an elongated tube with a telescopic sleeve having a closure cap at one end for controlling the exposure of a pesticide-solid carrier composition such as a herbicide-wax composition anchored to and projecting from the said end of the elongated tube. The solid composition can be anchored to the end of the elongated tube such as by keying of the solid composition in a plurality of holes formed in the said end of the tube.

15 Claims, 3 Drawing Sheets

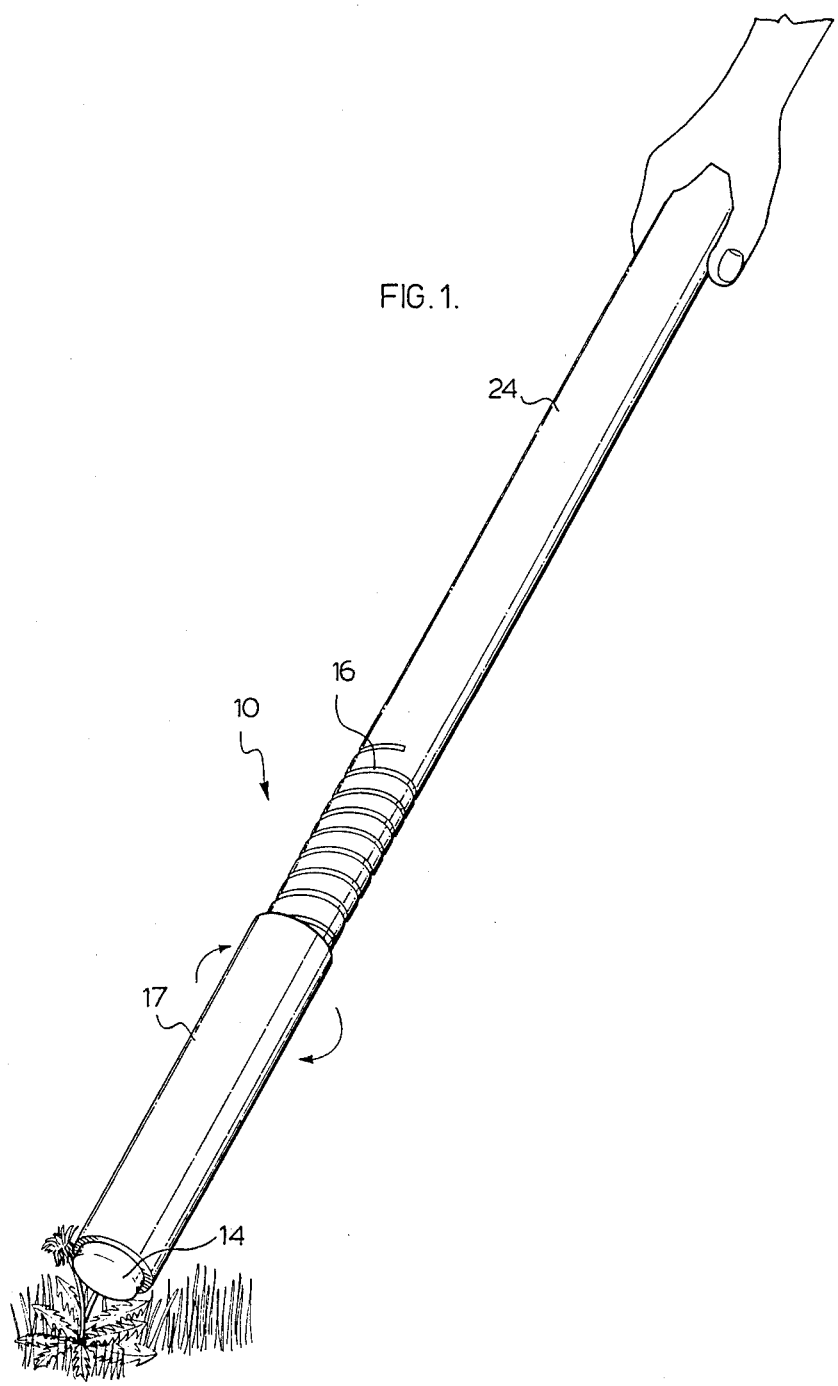

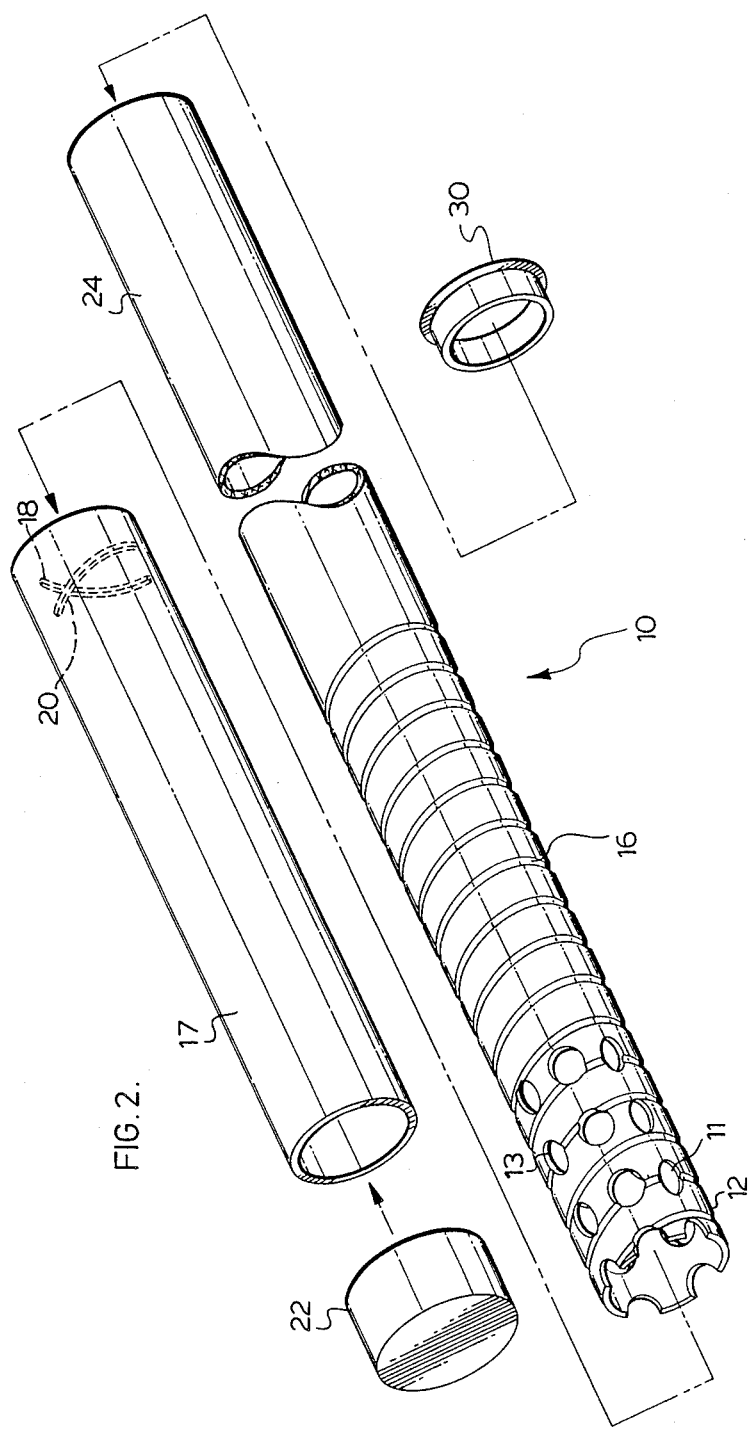

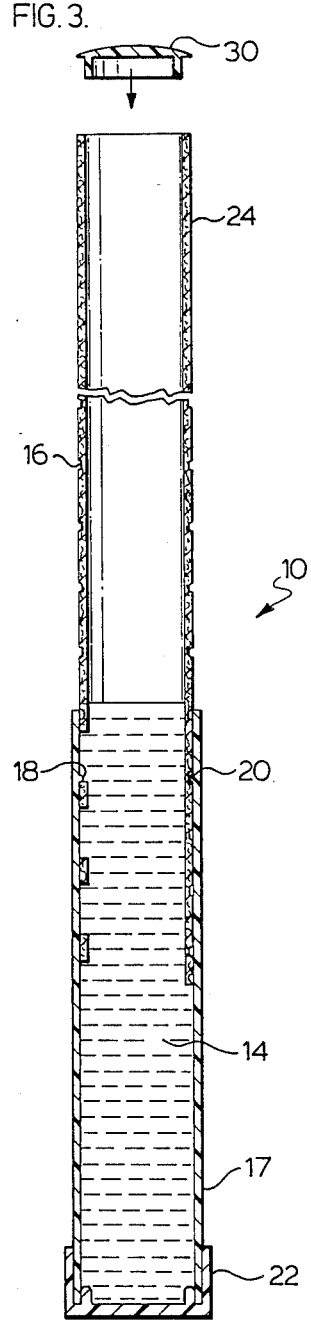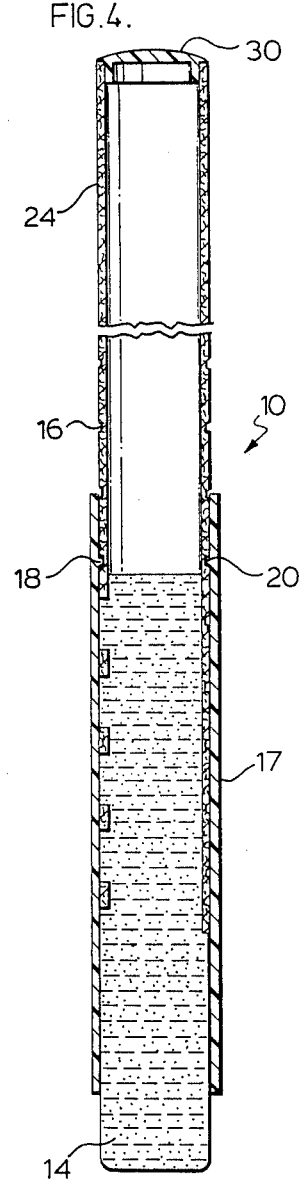

4,882,874

PESTICIDE APPLICATOR

BACKGROUND OF THE INVENTION

This invention relates to a pesticide applicator and, more particularly, relates to a pesticide applicator for spot application of pesticides such as herbicides to broadleaf weeds.

Weed-killer applicators in the form of elongated tubes for the application of herbicides such as of the 2, 4-D type are known. For example, U.S. Pat. Nos. 1,608,860 and 2,979,757 disclose elongated applicators for applying liquid herbicides to broadleaf weeds. Both applicators have relatively complex valving and application controls for dispensing a desired quantity of herbicide to weeds.

The present invention comprises an applicator for a pesticide which allows spot application of a pesticide with a solid carrier such as wax, which is normally solid at ambient temperatures, directly to the area to be treated. The invention will be described with reference to an applicator for herbicide in a wax carrier which permits spot application of the herbicide directly to weeds in a manner which will resist dilution by water, such as rain water, and which will result in a more efficient application of herbicides. It will be understood that although the following description will proceed with reference to a herbicide and solid wax composition, other pesticides such as insecticides, bactericides and the like pesticides in various solid carriers are encompassed within the scope of the invention.

SUMMARY OF THE INVENTION

In its broad aspect, the applicator of the invention comprises an elongated tube, a telescopic sleeve mounted at one end onto one end of the tube and projecting from said tube for axial movement along said tube, i.e. for retraction and extension of the said sleeve on the end of the tube, a pesticide-solid carrier composition disposed within the sleeve and projecting from the adjacent end of the tube, and means for anchoring said pesticide-solid carrier composition within the said adjacent end of the tube, whereby retraction of the telescopic sleeve by axial movement of the sleeve along the tube exposes the pesticide-solid carrier composition.

The elongated tube preferably has an external thread formed at one end, and the telescopic sleeve has mating means for engaging said external thread for axial extension and retraction of the telescopic sleeve on the elongated tube by rotation of the sleeve thereon. The mating means preferably comprise opposed internal ribs formed within said sleeve for mating with and engaging the external thread of the tube. A removable cap preferably is mounted on the distal end of the sleeve to close the sleeve.

The anchoring means formed in the tube preferably comprise a plurality of perforations formed in the end of the tube, but may include inwardly projecting tabs formed from the tube, for keying of the pesticide-solid carrier composition therein. The pesticide-solid carrier composition preferably is liquified, such as by melting, poured into the sleeve and adjacent end of the tube, and allowed to solidify therein to anchor in said perforations or grip the tabs or like keying means. The pesticide-solid carrier may be formed externally of the applicator by casting in a mould, inserted into the applicator tube and anchored therein such as by a crimp in the tube wall or by a pin or staple projecting through the tube wall into the solid pesticide-solid carrier.

BRIEF DESCRIPTION OF THE DRAWINGS

FIG. 1 is a perspective view of the applicator of the invention in an operative position;

FIG. 2 is an exploded perspective view of the said applicator including telescopic sleeve and closure cap indicating internal ribs for engaging external threads formed in the applicator tube;

FIG. 3 is a longitudinal section of the said applicator showing the closure cap attached to the telescopic sleeve; and FIG. 4 is a longitudinal section of the applicator with the closure cap removed and telescopic sleeve retracted.

DESCRIPTION OF THE PREFERRED EMBODIMENTS

The applicator of the invention illustrated in the drawings comprises an elongated tube 10 having a plurality of holes 11 formed in the side wall at lower end 12 for anchoring a pesticide-wax composition 14 normally cast therein. Tube 10 preferably is formed of a plastics material or of wound paper having decoration and indicia on the exterior surface provided by coloured paper and/or a plastic finish for an aesthetic appearance. A thin plastic lamination can be provided on the embodiment of a coloured outer layer of paper for moisture resistance and to provide a smooth, low-friction coating.

The lower portion 12 of tube 10 is threaded by the impression of a single thread or double threads 16 having a coarse pitch of about 1 inch.

The double threaded embodiment formed in the paper tube embodiment effectively spreads the load when a telescopic sleeve 17 is threaded onto the lower end 12 of tube 10 to enclose pesticide-wax composition 14.

Telescopic sleeve 17 comprises a tube preferably formed of high density polyethylene which has at one end opposed internal ribs 18, 20 adapted to engage threads 16 to permit telescopic sleeve 17 to be moved axially up or down tube 10 upon rotation of sleeve 17 on tube 10. Telescopic sleeve 17 has a plastic closure cap 22 covering and engaging the distal and thereof.

The applicator may be loaded by threading telescopic sleeve 17 with closure cap 22 onto the perforated end 12 of tube 10 to the position shown by ghost lines in FIG. 1 to enclose perforations or holes 11. Liquified carrier such as heated paraffin wax, containing a desired quantity of pesticide to form a pesticide wax composition, is poured into the upper end 24 of tube 10 while tube 10 is upright until a desired quantity is received within closed sleeve 17 and tube end 12. It is desired that the pesticide wax composition fills the lower end of the tube and the telescopic sleeve at least to cover some of the holes 11 and engage the hole edges 13. The pesticide wax composition thus fills a sufficient number of holes to effectively anchor and key the composition when it has cooled and solidified therein. A closure plug 30 is inserted into the upper end of tube 10 and the applicator is ready for merchandising and for use.

The pesticide-solid carrier may be formed by casting the pesticide-solid carrier composition in a mould, inserting the solidified carrier composition into the applicator tube, and anchoring the said composition therein such as by the use of pins or staples projecting through the tube wall or by a crimp in the tube wall.

The pesticide-solid carrier composition 14 comprises a normally solid carrier preferably having a melting point, if any, above 35° C., a tensile strength of 10–400 psi, and a Shore A hardness of 10–90. Suitable solid carriers are: solid soaps; beeswax; mixtures of, by weight, 1–30% paraffin oil and 70–99% paraffin wax; 1–20% microcrystalline wax, 70–90% paraffin wax and 10–30% paraffin oil, modelling clay and felt. A surfactant such as ammonium stearate preferably is added in an amount of 1–20% by weight to the above carriers.

The following examples show non-limitative formulations, by weight, of herbicidal compositions advantageously applied by the applicator of the invention.

EXAMPLE 1

0.1–5% DiCamba, 0.5–15% 2,4-D, 0.5–15% Mecoprop, 65–98.9% solid carrier (composed of paraffin wax and oil including up to 20% surfactant).

EXAMPLE 2

1–10% sodium sesqui salt on N-(phosphonemethyl) glycine 90–99% solid carrier (composed of paraffin wax and oil including up to 20% surfactant).

EXAMPLE 3

1–10% sodium sesqui salt on N-(phosphonemethyl) glycine; 2–10% 2,4-D; 1–10% Mecoprop; 0.1–5% DiCamba; and 70–90% solid carrier (composed of paraffin wax and oil including up to 20% surfactant).

EXAMPLE 4

2–15% monosodium acid metharsonate; and 85–98% solid carrier (composed of paraffin wax and oil including up to 20% surfactant).

EXAMPLE 5

1.1–10% 2,4-D; 1.2–10% Promatone$_{TM}$ (2,4 bisisopropylamino) 6 methoxy-5-triazine and 80–97.7% solid carrier (composed of paraffin wax and oil including up to 20% surfactant).

EXAMPLE 6

4–40% insect repellent; and 60–96% solid carrier (composed of paraffin wax and oil including up to 20% surfactant).

In use, closure cap 22 is removed and telescopic sleeve 17 is twisted for rotation on tube 10 for retracted axial movement upwardly, as viewed in FIG. 1. The desired quantity of pesticide-wax composition 14 can thus be exposed for application to weeds and, upon completion of use, telescopic sleeve 17 is extended to completely envelop the wax pesticide composition by reverse rotation and the closure cap 22 replaced upon the open distal end to completely enclose it.

It will be understood, of course, that modifications can be made in the embodiment of the invention illustrated and described herein without departing from the scope and purview of the invention as defined by the appended claims.

THE EMBODIMENTS OF THE INVENTION IN WHICH AN EXCLUSIVE PROPERTY OR PRIVILEGE IS CLAIMED, ARE DEFINED AS FOLLOWS:

1. A pesticide applicator comprising an elongated tube, a telescopic sleeve mounted on said tube on one end thereof and projecting from said tube for axial movement for extension and retraction thereon, a pesticide-solid carrier composition disposed within the sleeve and extending into an adjacent end of the tube, and means for anchoring said pesticide-solid carrier composition within the said adjacent end of the tube, whereby retraction of the telescopic sleeve on the tube exposes the pesticide-solid carrier composition.

2. A pesticide applicator as claimed in claim 1, in which the pesticide-solid carrier composition is formed separately and is anchored within the elongated tube after solidification.

3. A pesticide applicator comprising an elongated tube, a telescopic sleeve threaded onto one end of the tube and projecting from said tube for axial retraction and extension along the tube by rotation of the sleeve on the tube, a pesticide-solid carrier composition formed within the sleeve and extending into the threaded end of the tube, and means for anchoring said pesticide-solid carrier composition within the said adjacent end of the tube, whereby retraction of the telescopic sleeve on the tube exposes the pesticide-solid carrier composition.

4. A pesticide applicator as claimed in claim 3, in which the elongated tube has an external thread formed at one end and the telescopic sleeve has mating means for engaging said external thread for axial retraction and extension of the telescopic sleeve on the elongated tube by rotation of the sleeve thereon.

5. A pesticide applicator as claimed in claim 4, in which said means for anchoring the pesticide-solid carrier composition comprises a plurality of holes formed at the threaded end of the elongated tube for receiving the solid carrier composition therein.

6. A pesiticide applicator as claimed in claim 5, in which the pesticide-solid carrier composition comprises at least one pesticide selected from the group consisting of a herbicide, an insecticide and a bactericide.

7. A pesiticide applicator as claimed in claim 6, in which the solid carrier has a melting point above 35° C., a tensile strength of 10–400 psi, and a Shore A hardness of 10–90 and is selected from the group consisting of mixtures, by weight, of, 1–30% paraffin oil and 70–99% paraffin wax; and 1–20% microcrystalline wax, 70–90% paraffin wax and 10–30% paraffin oil.

8. A pesticide applicator as claimed in claim 6, in which the solid carrier is selected from the group consisting of solid soaps, beeswax, modelling clay and felt.

9. A pesticide applicator as claimed in claim 7, in which the external thread formed on one end of the elongated tube has a single or double thread having a coarse pitch of about 1 inch.

10. A pesticide applicator as claimed in claim 9, in which said tube is formed of a plastics material or formed of paper having a plastics finish or a plastics laminate formed thereon to provide a smooth, low-friction coating.

11. A pesticide applicator as claimed in claim 6, in which the mating means in the telescopic sleeve for engaging the external tube thread comprises a pair of opposed ribs formed on the telescopic sleeve.

12. A pesticide applicator as claimed in claim 6, in which the pesticide-solid carrier composition is formed within the sleeve and extends into the adjacent end of the tube.

13. A pesticide applicator as claimed in claim 6 in which the pesticide-solid carrier composition is anchored in the adjacent end of the tube by casting liquified pesticide-solid carrier composition within the sleeve and adjacent end of the tube.

14. A pesticide applicator as claimed in claim 7 in which the pesticide-solid carrier composition is formed within the sleeve and extends into the adjacent end of the tube.

15. A pesticide applicator as claimed in claim 7 in which the pesticide-solid carrier composition is anchored in the threaded end of the tube by casting liquified pesticide-solid carrier composition within the sleeve and threaded end of the tube.

* * * * *